No. 872,365. PATENTED DEC. 3, 1907.
W. E. VER PLANCK.
SHAFT BEARING.
APPLICATION FILED JULY 13, 1905.
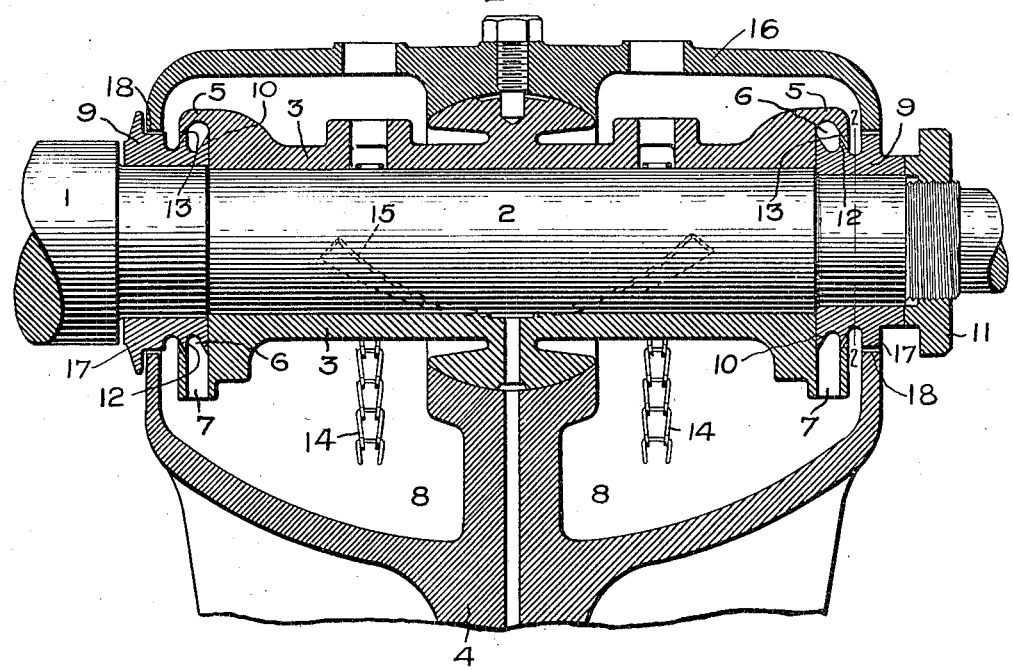
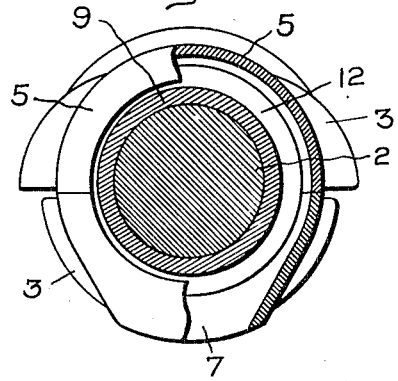
Witnesses:
Marcus L Byng.
Alex F. Macdonald.
Inventor:
William E. Ver Planck.
By Albert G. Davis
Att'y

UNITED STATES PATENT OFFICE.

WILLIAM EVERETT VER PLANCK, OF SWAMPSCOTT, MASSACHUSETTS, ASSIGNOR TO GENERAL ELECTRIC COMPANY, A CORPORATION OF NEW YORK.

SHAFT-BEARING.

No. 872,365.          Specification of Letters Patent.          Patented Dec. 3, 1907.

Application filed July 13, 1905. Serial No. 269,449.

*To all whom it may concern:*

Be it known that I, WILLIAM EVERETT VER PLANCK, a citizen of the United States, residing at Swampscott, county of Essex, State of Massachusetts, have invented certain new and useful Improvements in Shaft-Bearings, of which the following is a specification.

This invention relates to bearings for rotating shafts, and especially those which revolve at high speed, such as the shafts of steam turbines. It becomes a matter of some difficulty to lubricate such bearings properly owing to the tendency of the oil to fly off at the end of the pillow block, especially when a thrust bearing is used.

The object of the present invention is to overcome this difficulty and enable a large quantity of oil to be supplied to the bearing and returned to the oil well without being thrown off. This result is obtained by providing the shaft with a deflector rotating in close proximity to but not touching a stationary hood. At high speeds a drop of oil will not adhere to the deflector when dropped thereon, but will roll off like a drop of water on a hot plate. But by making the passage through which the oil has to pass very much restricted, the drop is brought forcibly in contact with the deflector and is thrown off thereby, so that no oil will be able to pass through the restricted passage.

In the accompanying drawing, Figure 1 is a longitudinal section of a shaft bearing embodying my invention. Fig. 2 is a cross section on the line 2 2, Fig. 1.

The shaft 1 has a journal 2 which is fitted with brasses 3 suitably supported in a pillow block 4 having a cap 16. At one or both ends of the brasses is formed a hood 5, in which is provided an undercut groove or chamber 6 surrounding the shaft and communicating at its lowest part with a spout 7 opening downwardly into the oil well 8. Secured to the shaft is a collar 9 which has a flange 10 abutting the end of the brasses so as to resist end thrust and serve as a thrust bearing. The engaging face of the flange is flat and its opposite face is beveled toward the journal. The collar is preferably fitted on a tapered portion of the shaft adjacent to the journal, and if desired it may be retained in place by a nut 11 screwed upon a screw-threaded shoulder on the shaft.

In addition to the shoulder 10, the collar has a flange or deflector 12 adjacent to and inside of the overhanging rim of the hood. The edges of these two parts are overlapped, preferably on a diagonal line, so as to leave between them a narrow annular space 13. The collar of course rotates with the shaft, while the hood is stationary. The collar 9 is also provided with a flange 17 which rotates within the opening 18 in the end of the pillow block. This flange has sufficient clearance in the opening to provide for smooth running.

Lubricant is fed to the journal in any suitable manner, as for instance by means of the endless chains 14 hung on the journal and depending into the oil well through suitable slots in the brasses. The oil may be distributed along the journal by means of the curved grooves 15 in the inside surface of the brasses.

When the shaft is rotated at high speed, the oil will flow to the ends of the journal and pass radially outward into the hood, practically filling the hood and flowing down through the spout into the oil well. Any drops of oil that attempt to pass through the restricted passage between the hood and the flange on the collar will be brought into forcible contact with the flange, or deflector, and thrown radially outward into the hood. There is thus no possibility of any oil being thrown out through the end of the pillow block.

What I claim as new and desire to secure by Letters Patent of the United States, is:

1. The combination of a shaft having a journal, brasses in which the journal rotates, a beveled flange mounted on the shaft which abuts the end of the brasses, a second beveled flange parallel to the first and spaced therefrom, an annular hood formed on the ends of the brasses within which the flanges rotate, said hood having a beveled edge overhanging the beveled edge of the second flange and separated therefrom by a narrow space, and a drain from the lower portion of the hood.

2. The combination of a shaft having a journal, brasses for the journal, a collar on the shaft provided with a flange having a flat face abutting the brasses at one end of the journal, the opposite face being beveled and intersecting the first face to form a thin edge, and a second similarly shaped flange parallel to the first, a hood formed on the ends of the brasses adjacent the collar which incloses a chamber between it and the flanges and has an inwardly projecting rim lying in the same plane with the second flange, the edge of the rim being parallel to the beveled edge of said flange and separated therefrom by a narrow space leading to the chamber, and a drain at the bottom of the chamber.

3. The combination of a shaft having a journal, brasses for the journal, a collar on the shaft provided with a flange having a flat face which abuts the end of the brasses, the opposite face of the flange being beveled, a second beveled flange parallel to the first and spaced therefrom, and a third flange beyond the second, an annular hood formed on the ends of the brasses within which the first flange rotates, said hood having a beveled edge lying in the same plane as the second flange and separated therefrom by a narrow space, a pillow block which supports the brasses and is provided with an opening of slightly greater diameter than the third flange within which said flange rotates, and a drain from the lower portion of the hood.

4. In a shaft bearing, the combination with a pillow block, cap and a journal 2, of brasses 3 having annular hoods 5 formed on the ends thereof, and collars 9 secured to the shaft and having flanges 10 abutting said brasses and deflecting flanges 12 inside of said hoods and separated therefrom by a narrow space.

In witness whereof, I have hereunto set my hand this thirtieth day of June, 1905.

WILLIAM EVERETT VER PLANCK.

Witnesses:
JOHN A. MCMANUS, Jr.,
HENRY O. WESTENDARP.